(12) United States Patent
Inoue et al.

(10) Patent No.: US 8,385,049 B2
(45) Date of Patent: Feb. 26, 2013

(54) DIELECTRIC CERAMIC AND LAMINATED CERAMIC CAPACITOR

(75) Inventors: Noriyuki Inoue, Nagaokakyo (JP);
Hitoshi Nishimura, Nagaokakyo (JP);
Toshihiro Okamatsu, Nagaokakyo (JP);
Takafumi Okamoto, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 160 days.

(21) Appl. No.: 13/090,818

(22) Filed: Apr. 20, 2011

(65) Prior Publication Data

US 2011/0205687 A1    Aug. 25, 2011

Related U.S. Application Data

(63) Continuation of application No. PCT/JP2009/065291, filed on Sep. 2, 2009.

(30) Foreign Application Priority Data

Oct. 21, 2008   (JP) ................................. 2008-271066

(51) Int. Cl.
*H01G 4/06* (2006.01)
*C04B 35/00* (2006.01)

(52) U.S. Cl. ............... 361/321.4; 361/321.1; 501/139

(58) Field of Classification Search ....... 361/321.1–321.5, 361/311, 320; 501/137–139
See application file for complete search history.

(56) References Cited

U.S. PATENT DOCUMENTS

| | | | |
|---|---|---|---|
| 6,522,521 B2 | 2/2003 | Mizuno et al. | |
| 7,242,571 B2 | 7/2007 | Okamatsu et al. | |
| 7,498,285 B2 * | 3/2009 | Ito et al. | 501/136 |
| 7,626,803 B2 | 12/2009 | Okamatsu et al. | |
| 2002/0039272 A1 | 4/2002 | Mizuno et al. | |
| 2005/0122639 A1 | 6/2005 | Okamatsu et al. | |
| 2007/0236865 A1 | 10/2007 | Okamatsu et al. | |
| 2008/0226927 A1 | 9/2008 | Kaneda et al. | |

FOREIGN PATENT DOCUMENTS

| | | |
|---|---|---|
| JP | 03278415 A | 12/1991 |
| JP | 08151260 A | 6/1996 |
| JP | 2002050536 A | 2/2002 |
| JP | 2005187296 A * | 7/2005 |
| JP | 2007234677 A * | 9/2007 |
| JP | 2008201616 A | 9/2008 |
| JP | 2008222520 A | 9/2008 |
| WO | WO-2004067473 A1 | 8/2004 |
| WO | WO-2006067958 A1 | 6/2006 |

OTHER PUBLICATIONS

Written Opinion of the International Searching Authority, mailed Oct. 6, 2009.

* cited by examiner

*Primary Examiner* — Eric Thomas
(74) *Attorney, Agent, or Firm* — Dickstein Shapiro LLP

(57) ABSTRACT

Provided is a dielectric ceramic which exhibits desired high temperature load resistance characteristics even under a high electric field strength on the order of 15 kV/mm. The dielectric ceramic contains, as its main constituent, a perovskite compound represented by the general formula $(Ba_{1-h-i-m}Ca_hSr_iGd_m)_k(Ti_{1-y-j-n-o-p}Zr_yHf_jMg_nZn_oMn_p)O_3$, $0 \leq h \leq 0.03$, $0 \leq i \leq 0.03$; $0.042 \leq m \leq 0.074$; $0.94 \leq k \leq 1.075$; $0 \leq (y+j) \leq 0.05$; $0.015 \leq n \leq 0.07$; $0 \leq o \leq 0.04$; $0 \leq p \leq 0.05$; and $1.0 < m/(n+o) < 4.3$. The dielectric ceramic can be used advantageously as a material for a dielectric ceramic layer provided in a laminated ceramic capacitor.

19 Claims, 1 Drawing Sheet

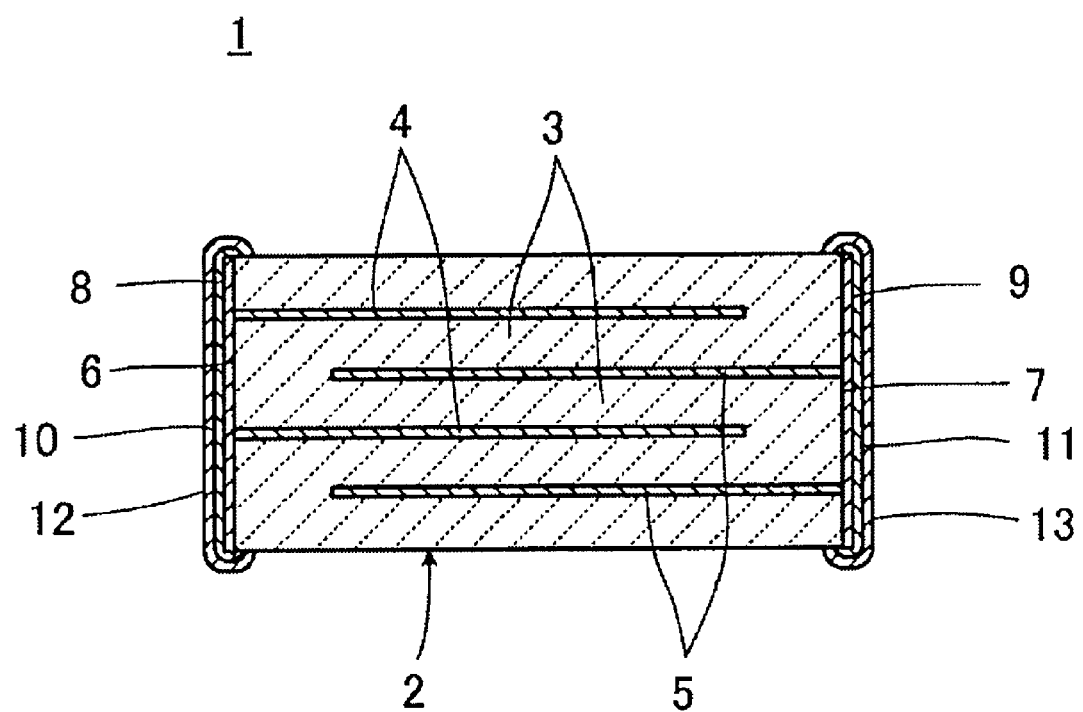

DIELECTRIC CERAMIC AND LAMINATED CERAMIC CAPACITOR

This is a continuation of application Serial No. PCT/JP2009/065291, filed Sep. 2, 2009, the contents of which are incorporated herein by reference.

TECHNICAL FIELD

The present invention relates to a dielectric ceramic and a laminated ceramic capacitor configured with the use of the dielectric ceramic, and more particularly, relates to a dielectric ceramic for use under a relatively high electric field.

BACKGROUND ART

Laminated ceramic capacitors are produced commonly as follows.

First, ceramic green sheets containing a raw material powder of the dielectric ceramic are prepared which have surfaces provided with a conductive material to serve as internal electrodes in a desired pattern. As the dielectric ceramic, for example, used is a dielectric ceramic which contains $BaTiO_3$ as its main constituent.

Next, multiple ceramic green sheets including the ceramic green sheets provided with the conductive material described above are stacked, and subjected to thermocompression bonding, thereby manufacturing a integrated raw laminate.

Next, this raw laminate is subjected to firing to obtain a sintered laminate. This laminate has internal electrodes formed therein, which are composed of the conductive material described above.

Then, external electrodes are formed on the outer surface of the laminate so as to be electrically connected to specific ones of the internal electrodes. The external electrodes are formed by, for example, providing a conductive paste containing a conductive metal powder and glass frit on the outer surface of the laminate and firing the conductive paste.

In this way, a laminated capacitor is completed.

In recent years, a reduction in thickness per dielectric ceramic layer has been required for laminated ceramic capacitors in order to meet the needs of reduction in size and increase in capacitance. When the dielectric ceramic layer is reduced in thickness, the electric field strength applied on the dielectric ceramic is relatively increased, and it is thus necessary to ensure an insulation property and reliability in a high electric field strength more than ever.

Patent Document 1 discloses a dielectric ceramic which exhibits great lifetime characteristics in a high temperature load test with a temperature of 150° C. and an electric field strength of 10 kV/mm.

Patent Document 1: WO2004/067473

DISCLOSURE OF THE INVENTION

Problem to be Solved by the Invention

However, the dielectric ceramic described in Patent Document 1 has the problem of exhibiting degradation of lifetime characteristics as measured by a high temperature load test in the case of the application of an electric field strength greater than 10 kV/mm.

Therefore, an object of the present invention is to provide a dielectric ceramic which exhibits sufficient high temperature load resistance characteristics even in a high electric field strength on the order of 15 kV/mm, and a laminated ceramic capacitor configured with the use of the dielectric ceramic.

Means for Solving the Problem

In order to solve the above-mentioned technical problems, the present invention provides a dielectric ceramic containing, as its main constituent, a perovskite compound represented by the general formula $(Ba_{1-h-i-m}Ca_hSr_iGd_m)_k(Ti_{1-y-j-n-o-p}Zr_yHf_jMg_nZn_oMn_p)O_3$, and satisfying the following $0 \leq h \leq 0.03$; $0 \leq i \leq 0.03$; $0.042 \leq m \leq 0.074$; $0.94 \leq k \leq 1.075$; $0 \leq (y+j) \leq 0.05$; $0.015 \leq n \leq 0.07$; $0 \leq o \leq 0.04$; $0 \leq p \leq 0.05$; and $1.0 < m/(n+o) < 4.3$.

The dielectric ceramic according to the present invention preferably contains 3.0 parts by mol or less of M (M is at least one of V, Cr, Cu, and Ni) and contains 0.2 to 8 parts by mol of Si with respect to 100 parts by mol of the main constituent.

Also, the dielectric ceramic according to the present invention preferably contains 2.0 parts by mol or less of R (R is at least one of La, Ce, Pr, Nd, Sm, Eu, Tb, Dy, Ho, Er, Tm, Yb, Lu, Y, and Sc) with respect to 100 parts by mol of the main constituent.

The present invention is also directed to a laminated ceramic capacitor including: a plurality of dielectric ceramic layers stacked and internal electrodes formed along specific interfaces between the dielectric ceramic layers; and external electrodes formed on an outer surface of the laminate so as to be electrically connected to specific ones of the internal electrodes. The laminated ceramic capacitor according to the present invention is characterized in that the dielectric ceramic layers are composed of the dielectric ceramic according to the present invention.

Effects of the invention

In the dielectric ceramic according to the present invention, great high temperature load resistance characteristics can be achieved even under a high electric field strength by interaction between Gd in solid solution at the A site of the perovskite and Mg in solid solution at the B site thereof. In particular, in accordance with the relatively high Gd content and the appropriate content ratio of the Gd content to the Mg content, great high temperature load resistance characteristics can be ensured even under a high electric field strength on the order of 15 kV/mm.

BRIEF EXPLANATION OF DRAWINGS

FIG. 1 is a cross-sectional view schematically illustrating a laminated ceramic capacitor 1 configured with the use of a dielectric ceramic according to the present invention.

BEST MODE FOR CARRYING OUT THE INVENTION

The structure of a laminated ceramic capacitor 1 with a dielectric ceramic according to the present invention advantageously applied thereto will be described with reference to FIG. 1.

The laminated ceramic capacitor 1 includes a laminate 2. The laminate 2 is composed of a plurality of stacked dielectric ceramic layers 3 and of a plurality of internal electrodes 4 and 5 respectively formed along a plurality of specific interfaces between the plurality of dielectric ceramic layers 3.

The internal electrodes 4 and 5 preferably contain Ni as their main constituent. While the internal electrodes 4 and 5 are formed to reach the outer surface of the laminate 2, the internal electrodes 4 drawn to one end surface 6 of the laminate 2 and the internal electrodes 5 drawn to the other end surface 7 thereof are arranged alternately in the laminate 2.

External electrodes 8 and 9 are formed respectively on end surfaces 6 and 7 of the outer surface of the laminate 2. The external electrodes 8 and 9 are formed by, for example, by applying and firing a conductive paste containing Cu as its main constituent. One external electrode 8 is electrically connected to the internal electrodes 4 on the end surface 6, whereas the other external electrode 9 is electrically connected to the internal electrodes 5 on the end surface 7.

In order to improve the soldering property, if necessary, first plating films 10 and 11 composed of Ni, or the like are formed on the external electrodes 8 and 9, and second plating films 12 and 13 composed of Sn or the like are further formed thereon, respectively.

In this laminated ceramic capacitor 1, the dielectric ceramic layers 3 are composed of a dielectric ceramic according to the present invention. The dielectric ceramic according to the present invention contains, as its main constituent, a perovskite compound represented by the general formula $(Ba_{1-h-i-m}Ca_hSr_iGd_m)_k(Ti_{1-y-j-n-o-p}Zr_yHf_jMg_nZn_oMn_p)O_3$, which is characterized by $0 \leq h \leq 0.03$; $0 \leq i \leq 0.03$; $0.042 \leq m \leq 0.074$; $0.94 \leq k \leq 1.075$; $0 \leq (y+j) \leq 0.05$; $0.015 \leq n \leq 0.07$; $0 \leq o \leq 0.04$; $0 \leq p \leq 0.05$; and $1.0 < m/(n+o) < 4.3$.

The dielectric ceramic containing the $BaTiO_3$ based compound as its main constituent according to the present invention is characterized in that Gd is present in solid solution at the A site of the perovskite and Mg is present in solid solution at the B site thereof.

When the microstructure of the dielectric ceramic described above is observed, Gd and Mg are present in a nearly homogeneous manner in main crystal grains containing the $BaTiO_3$ based compound as its main constituent. In this case, as long as the content m of Gd and the content n of Mg fall within the ranges specified in the present invention, Gd is present at the A site, whereas Mg is present at the B site, in terms of ionic radius and charge compensation.

In the case of the content m of Gd from 0.042 to 0.074 and the content n of Mg from 0.015 to 0.07, and further, the ratio of $m/(n+o)$ of the Gd content to the total content of Mg and Zn greater than 1 and less than 4.3, the lifetime characteristics are improved in a high temperature load test under an electric field of 15 kV/mm. In this case, while the Zn at the B site may contribute to the lifetime characteristics, Zn may be absent as long as an appropriate amount of Mg is present.

Likewise, Ca and Sr may be present at the A site. In addition, Zr, Hf, and Mn may be present at the B site. However, if the upper limits for these elements exceed the ranges specified in the present invention, the high temperature load resistance characteristics will be decreased.

In addition, Mn is preferably present at the B site described above in the solid solution. In this case, the high temperature load resistance characteristics will be further improved since the number of oxygen vacancies in the crystal grains is believed to be reduced.

Furthermore, the A/B site ratio k of the perovskite is 0.94 to 1.075. When k falls within in this range, Gd and Mg are likely to be present at the predetermined site in solid solution. Therefore, this appropriate value of k contributes to an improvement in high temperature load resistance characteristics.

It is to be noted that while the elements mentioned above such as Gd, Mg, and Mn are mainly present in the main crystal grains, the elements may also be present at grain boundaries or triple points without departing from the object of the present invention.

In addition, the dielectric ceramic according to the present invention may contain respective proper amounts of M (M is at least one of V, Cr, Cu, and Ni), Si, and R (R is at least one of La, Ce, Pr, Nd, Sm, Eu, Tb, Dy, Ho, Er, Tm, Yb, Lu, Y, and Sc), if necessary, in order to ensure various types of electric properties and reliability. The locations of these M, Si, and R are not particularly limited.

Further, the M is preferably contained at 3.0 parts by mol or less with respect to 100 parts by mol of the main constituent. The Si is preferably contained at 0.2 to 8 parts by mol with respect to 100 parts by mol of the main constituent. The R is preferably contained at 2.0 parts by mol or less with respect to 100 parts by mol of the main constituent.

Next, a method for producing the dielectric ceramic according to the present invention will be described.

In the case of, for example, preparing a ceramic raw material by a solid-phase synthesis method for the production of the dielectric ceramic according to the present invention, $BaCO_3$ and $TiO_2$, which are starting raw materials for $BaTiO_3$, as well as $Gd_2O_3$, $MgCO_3$, and $MnCO_3$ are preferably mixed simultaneously, and combined by a heat treatment, in order to ensure that Gd, Mg, Mn, etc. are present as a solid solution. In this way, a $BaTiO_3$ based powder which is modified with Gd, Mg, Mn, etc., is obtained.

Next, respective compounds such as M, Si, and R are added to the modified $BaTiO_3$ based powder, and mixed. In this case, $BaCO_3$, $CaCO_3$, $SrCO_3$, etc. may be added in order to adjust the A/B ratio. Through this mixing and drying, a ceramic raw material powder is obtained.

In addition, while a $SiO_2$ powder is used as a starting raw material for Si, it is not preferable if the $SiO_2$ powder is mixed with the $BaCO_3$ and $TiO_2$ starting raw materials of $BaTiO_3$. This is because in such a case, Si may be linked with Gd during the synthesis by heat treatment and interfere with solid solubility of Gd at the A site in some cases, thereby resulting in cumbersome control of Gd solid solubility.

The same methods as used conventionally can be adopted for the production of a laminated ceramic capacitor, which is carried out with the use of the ceramic raw material powder after the ceramic raw material powder is obtained.

Next, experimental examples will be described which were carried out in order to confirm the advantageous effect produced by the present invention.

Experimental Example 1

Respective powders of $BaCO_3$, $CaCO_3$, $SrCO_3$, $TiO_2$, $ZrO_2$, $HfO_2$, $Gd_2O_3$, $MgCO_3$, ZnO, and $MnCO_3$ each with a purity of 99.8% or more were prepared as starting raw materials for the dielectric ceramic.

Next, in order to obtain a main constituent powder represented by $(Ba_{1-h-i-m}Ca_hSr_iGd_m)_k(Ti_{1-y-i-n-o-p}Zr_yHf_jMg_nZn_oMn_p)O_3$, specific starting raw materials were mixed in water in a ball mill to provide the compositions shown in Table 1, and subjected to calcination at 1150° C. in the atmosphere, and ground. In this way, main constituent powders were obtained.

Next, respective powders of $V_2O_3$, NiO, CuO, $Cr_2O_3$, and $SiO_2$ each with a purity of 99.8% or more were prepared, weighed to provide the contained parts by mol a and b shown in Table 1 for M and Si with respect to 100 parts by mol of the main constituent, and mixed in water in a ball mill. These mixed materials were subjected to drying to provide ceramic raw material powders.

TABLE 1

| Sample Number | h Ca | i Sr | y Zr | j Hf | m Gd | n Mg | o Zn | p Mn | k A/B ratio | m/(n+o) Gd/(Mg+Zn) | a M Content/Element | B Si |
|---|---|---|---|---|---|---|---|---|---|---|---|---|
| 1 | 0.02 | 0.01 | 0.00 | 0.00 | 0.050 | 0.040 | 0.000 | 0.010 | 0.987 | 1.3 | 0.3/V | 1.5 |
| 2 | 0.03 | 0.00 | 0.00 | 0.00 | 0.050 | 0.040 | 0.000 | 0.010 | 1.000 | 1.3 | 0.3/V | 1.5 |
| * | 0.05 | 0.05 | 0.07 | 0.00 | 0.050 | 0.040 | 0.000 | 0.010 | 1.030 | 1.3 | 0.3/V | 1.5 |
| 4 | 0.00 | 0.02 | 0.03 | 0.01 | 0.050 | 0.040 | 0.000 | 0.010 | 1.035 | 1.3 | 0.3/V | 1.5 |
| 5 | 0.00 | 0.00 | 0.05 | 0.00 | 0.050 | 0.040 | 0.000 | 0.010 | 0.980 | 1.3 | 0.3/V | 1.5 |
| 6 | 0.00 | 0.03 | 0.00 | 0.05 | 0.050 | 0.040 | 0.000 | 0.010 | 0.980 | 1.3 | 0.3/V | 3.0 |
| * 7 | 0.00 | 0.00 | 0.08 | 0.07 | 0.050 | 0.040 | 0.000 | 0.010 | 0.980 | 1.3 | 0.3/V | 3.0 |
| * 8 | 0.00 | 0.00 | 0.00 | 0.00 | 0.034 | 0.032 | 0.000 | 0.007 | 1.005 | 1.1 | 0.3/V | 1.0 |
| * 9 | 0.00 | 0.00 | 0.00 | 0.00 | 0.038 | 0.032 | 0.000 | 0.007 | 1.005 | 1.2 | 0.3/V | 1.0 |
| 10 | 0.00 | 0.00 | 0.00 | 0.00 | 0.042 | 0.032 | 0.000 | 0.007 | 1.015 | 1.3 | 0.3/V | 1.0 |
| 11 | 0.00 | 0.00 | 0.00 | 0.00 | 0.054 | 0.032 | 0.000 | 0.007 | 1.025 | 1.7 | 0.3/V | 1.0 |
| 12 | 0.00 | 0.00 | 0.00 | 0.00 | 0.064 | 0.032 | 0.000 | 0.007 | 1.055 | 2.0 | 0.3/V | 1.0 |
| 13 | 0.00 | 0.00 | 0.00 | 0.00 | 0.074 | 0.032 | 0.000 | 0.007 | 1.070 | 2.3 | 0.3/V | 2.0 |
| * 14 | 0.00 | 0.00 | 0.00 | 0.00 | 0.080 | 0.032 | 0.000 | 0.007 | 1.080 | 2.5 | 0.3/V | 2.0 |
| * 15 | 0.00 | 0.00 | 0.02 | 0.00 | 0.068 | 0.010 | 0.000 | 0.015 | 1.020 | 6.8 | 0.3/V | 2.0 |
| 16 | 0.00 | 0.00 | 0.02 | 0.00 | 0.068 | 0.016 | 0.000 | 0.015 | 1.020 | 4.3 | 0.3/V | 2.0 |
| 17 | 0.00 | 0.00 | 0.02 | 0.00 | 0.068 | 0.048 | 0.000 | 0.015 | 1.020 | 1.4 | 0.3/V | 2.0 |
| 18 | 0.00 | 0.00 | 0.02 | 0.00 | 0.068 | 0.064 | 0.000 | 0.015 | 1.020 | 1.1 | 0.3/V | 2.0 |
| 19 | 0.00 | 0.00 | 0.02 | 0.00 | 0.072 | 0.070 | 0.000 | 0.015 | 1.020 | 1.0 | 0.3/V | 2.0 |
| * 20 | 0.00 | 0.00 | 0.02 | 0.00 | 0.072 | 0.080 | 0.000 | 0.015 | 1.020 | 0.9 | 0.3/V | 2.0 |
| 21 | 0.00 | 0.02 | 0.00 | 0.00 | 0.060 | 0.055 | 0.000 | 0.025 | 0.965 | 1.1 | 0.02/V | 0.5 |
| 22 | 0.00 | 0.02 | 0.00 | 0.00 | 0.060 | 0.035 | 0.020 | 0.025 | 0.965 | 1.1 | 0.02/V | 0.5 |
| 23 | 0.00 | 0.02 | 0.00 | 0.00 | 0.060 | 0.015 | 0.040 | 0.025 | 0.965 | 1.1 | 0.02/V | 0.5 |
| * 24 | 0.00 | 0.02 | 0.00 | 0.00 | 0.060 | 0.000 | 0.055 | 0.025 | 0.965 | 1.1 | 0.02/V | 0.5 |
| 25 | 0.00 | 0.00 | 0.00 | 0.00 | 0.060 | 0.038 | 0.000 | 0.000 | 1.000 | 1.6 | 1.5/V | 3.0 |
| 26 | 0.00 | 0.00 | 0.00 | 0.00 | 0.060 | 0.038 | 0.000 | 0.003 | 0.990 | 1.6 | 1.5/V | 3.0 |
| 27 | 0.00 | 0.00 | 0.00 | 0.00 | 0.060 | 0.038 | 0.000 | 0.050 | 0.940 | 1.6 | 1.5/V | 3.0 |
| * 28 | 0.00 | 0.00 | 0.00 | 0.00 | 0.060 | 0.038 | 0.000 | 0.070 | 0.930 | 1.6 | 1.5/V | 3.0 |
| 29 | 0.00 | 0.00 | 0.00 | 0.00 | 0.045 | 0.025 | 0.005 | 0.020 | 1.010 | 1.5 | 0.0 | 0.2 |
| 30 | 0.00 | 0.00 | 0.00 | 0.00 | 0.045 | 0.025 | 0.005 | 0.020 | 1.030 | 1.5 | 0.5/Cu | 8.0 |
| 31 | 0.00 | 0.00 | 0.00 | 0.00 | 0.045 | 0.025 | 0.005 | 0.020 | 1.010 | 1.5 | 0.2/V 0.3/Ni | 4.0 |
| 32 | 0.00 | 0.00 | 0.00 | 0.00 | 0.045 | 0.025 | 0.005 | 0.020 | 1.010 | 1.5 | 0.5/V 0.1/Cr | 3.0 |
| 33 | 0.00 | 0.00 | 0.00 | 0.00 | 0.045 | 0.025 | 0.005 | 0.020 | 1.015 | 1.5 | 0.5/V 2.5/Cr | 2.0 |
| 34 | 0.00 | 0.00 | 0.00 | 0.00 | 0.045 | 0.025 | 0.005 | 0.020 | 1.015 | 1.5 | 1.5/Cr 1.0/Ni | 5.0 |
| 35 | 0.00 | 0.00 | 0.00 | 0.00 | 0.045 | 0.025 | 0.005 | 0.020 | 1.010 | 1.5 | 0.8/Ni | 2.0 |
| * 36 | 0.00 | 0.00 | 0.00 | 0.00 | 0.045 | 0.025 | 0.005 | 0.020 | 1.035 | 1.5 | 3.0/Ni 1.0/Cr | 10.0 |

Then, the obtained ceramic raw material powders with the addition of a polyvinyl butyral based binder and an organic solvent such as ethanol were mixed in a ball mill to obtain a ceramic slurry. This ceramic slurry was subjected to sheet forming in accordance with a doctor blade method to obtain ceramic green sheets.

Next, a conductive paste containing Ni as its main constituent was applied by screen printing onto the ceramic green sheets to form conductive paste films to serve as internal electrodes. Then, the ceramic green sheets with the conductive paste films formed thereon were stacked so as to alternate the sides to which the conductive paste films were drawn, thereby providing a raw laminate.

The raw laminate was next heated to a temperature of 350° C. in a nitrogen atmosphere to burn the binder, and then subjected to firing at 1150° C. to 1300° C. for 2 hours in a reducing atmosphere composed of a $H_2$—$N_2$—$H_2O$ gas with its oxygen partial pressure one digit lower than a Ni/NiO equilibrium oxygen partial pressure to obtain a sintered laminate. This laminate included dielectric layers obtained by subjecting the ceramic green sheets to sintering and internal electrodes obtained by subjecting the conductive paste films to sintering.

A silver paste containing $B_2O_3$—$SiO_2$—BaO based glass frit was applied onto the both end surfaces of the fired laminate, and subjected to firing at a temperature of 800° C. in a nitrogen atmosphere to form external electrodes electrically connected to the internal electrodes.

The laminated ceramic capacitors thus obtained had external dimensions of 3.2 mm in length, 1.6 mm in width, and 0.7 in thickness, and the dielectric ceramic layer interposed between the internal electrodes had a thickness of 3 μm. In addition, the number of effective dielectric ceramic layers for the formation of capacitance was 100, and the electrode opposed per dielectric ceramic layer had an area of 2.1 mm².

The dielectric constant $\in$ was measured under the conditions of 25° C., 1 kHz, and 1 $V_{rms}$ for the dielectric ceramics constituting the dielectric ceramic layers in the laminated ceramic capacitors according to the respective samples described above. The results are shown in Table 2.

In addition, the dielectric constant $\in$ was measured under the condition of a voltage 0.05 $V_{rms}$ to obtain the ratio (%) of the measured dielectric constant $\in$ to the dielectric constant $\in$ under the condition of 1 $V_{rms}$ described above, which is shown as "AC Rate of Change (%)" in Table 2. A lower absolute value of the AC rate of change indicates a favorable dielectric material which has a small voltage dependency.

Furthermore, 100 samples for each laminated ceramic capacitor were subjected to a high temperature load test under a temperature of 125° C. and an electric field strength of 15 kV/mm per dielectric ceramic layer. The sample was regarded as a defective if insulation resistance value reached 100 kΩ during the test, and the number of defectives was counted after a lapse of 1000 hours and after a lapse of 2000 hours, and shown in Table 2.

TABLE 2

| Sample Number | Dielectric Constant $\epsilon_r$ | AC Rate of Change (%) | The Number of Defectives after 2000 hours in High Temperature Load Test | The Number of Defectives after 1000 hours in High Temperature Load Test |
|---|---|---|---|---|
| 1 | 3740 | −4.8 | 0/100 | 0/100 |
| 2 | 4620 | −11.9 | 0/100 | 0/100 |
| *3 | 820 | −0.2 | 100/100 | 15/100 |
| 4 | 1460 | −0.5 | 0/100 | 0/100 |
| 5 | 1730 | −0.7 | 0/100 | 0/100 |
| 6 | 1200 | −0.3 | 0/100 | 0/100 |
| *7 | 650 | −0.1 | 89/100 | 6/100 |
| *8 | 4300 | −23.2 | 100/100 | 100/100 |
| *9 | 5430 | −22.5 | 100/100 | 83/100 |
| 10 | 3980 | −15.2 | 0/100 | 0/100 |
| 11 | 3880 | −8.5 | 0/100 | 0/100 |
| 12 | 3350 | −2.9 | 0/100 | 0/100 |
| 13 | 2210 | −1.2 | 0/100 | 0/100 |
| *14 | 1670 | −0.7 | 100/100 | 48/100 |
| *15 | 2030 | −1.0 | 100/100 | 29/100 |
| 16 | 1920 | −0.9 | 0/100 | 0/100 |
| 17 | 1450 | −0.5 | 0/100 | 0/100 |
| 18 | 1310 | −0.4 | 0/100 | 0/100 |
| 19 | 1160 | −0.3 | 0/100 | 0/100 |
| *20 | 990 | −0.3 | 100/100 | 100/100 |
| 21 | 1590 | −0.6 | 0/100 | 0/100 |
| 22 | 1780 | −0.7 | 0/100 | 0/100 |
| 23 | 2030 | −0.8 | 0/100 | 0/100 |
| *24 | 2040 | −0.8 | 100/100 | 26/100 |
| 25 | 3830 | −4.5 | 17/100 | 0/100 |
| 26 | 3610 | −4.0 | 0/100 | 0/100 |
| 27 | 3270 | −1.8 | 0/100 | 0/100 |
| *28 | 2900 | −1.3 | 100/100 | 100/100 |
| 29 | 4760 | −12.2 | 2/100 | 0/100 |
| 30 | 3710 | −8.5 | 0/100 | 0/100 |
| 31 | 4080 | −9.3 | 0/100 | 0/100 |
| 32 | 3930 | −9.0 | 0/100 | 0/100 |
| 33 | 3800 | −8.7 | 0/100 | 0/100 |
| 34 | 3130 | −7.2 | 0/100 | 0/100 |
| 35 | 4100 | −9.4 | 0/100 | 0/100 |
| *36 | 2390 | −5.5 | 100/100 | 11/100 |

In Tables 1 and 2, the sample numbers with no symbol * refer to samples within the scope of the present invention.

As can be seen from Table 2, the samples within the scope of the present invention can provide great high temperature load resistance characteristics, and exhibited a high dielectric constant of 1000 or more and an excellent AC voltage dependency (AC rate of change) of a rate of change within −20%.

In contrast to these samples, when the content of any of Sr, Ca, Zr, and Hf was greater than the content within the scope of the present invention as in the case of samples 3 and 7, the dielectric constant was decreased to 1000 or less, and the high temperature load resistance characteristics were decreased substantially.

When Gd was less than the content within the scope of the present invention as in the case of samples 8 and 9, the high temperature load resistance characteristics were decreased substantially. In addition, the AC rate of change was increased substantially due to the ferroelectricity increased by an increase in Curie point to higher temperature. On the other hand, when the Gd content m was greater than 0.074 as in the case of sample 14, the influence of a heterogeneous phase containing Gd was increased to thereby decrease the high temperature load resistance characteristics.

When the Gd/(Mg+Zn) ratio was greater than 4.3 as in the case of sample 15, the heterogeneous phase containing Gd was increased, possibly due to excess donors in terms of charge balance, to decrease the high temperature load resistance characteristics. On the other hand, when the Gd/(Mg+Zn) ratio, that is, m/(n+o) was less than 1 as in the case of sample 20, the heterogeneous phase containing Mg was increased, possibly due to excess acceptors in terms of charge balance, to decrease the high temperature load resistance characteristics. In addition, sample 20 provided a small dielectric constant less than 1000.

When the Mg content was less than the content within the scope of the present invention as in the case of sample 24, the high temperature load resistance characteristics were decreased.

Further, although within the scope of the present invention, when the Mn content was low at the B site as in the case of sample 25, defectives were caused after 2000 hours in the high temperature load test. However, no defective was caused after 1000 hours in the high temperature load test, and sample 25 can be said to achieve the desired level with no practical problems.

On the other hand, when the Mn content was greater than the content within the scope of the present invention as in the case of sample 28, the heterogeneous phase containing Mn was increased and decreased the high temperature load resistance characteristics.

Although within the scope of the present invention, when the content of Mn added after the synthesis of the perovskite crystal was low as in the case of sample 29, the reliability was slightly decreased. This is believed to be because the amount of oxygen vacancies at grain boundaries was not able to be reduced sufficiently. It is to be noted that sample 29 achieves the desired level with no practical problems.

When the M and Si contents were greater than the contents within the scope of the present invention as in the case of sample 36, a heterogeneous phase containing M and Si was produced to decrease the high temperature load resistance characteristics.

Experimental Example 2

Respective powders of $BaCO_3$, $SrCO_3$, $TiO_2$, $Gd_2O_3$, $Sm_2O_3$, $Eu_2O_3$, $Tb_2O_3$, $DyCO_3$, $Y_2O_3$, $Ho_2O_3$, and $MnCO_3$ each with a purity of 99.8% or more were prepared as starting raw materials for the dielectric ceramic.

Next, in order to obtain a main constituent powder represented by $(Ba_{0.935}Sr_{0.005}Ln_{0.06})_{1.005}(Ti_{0.93}Mg_{0.04}Mn_{0.03})O_3$ (while Ln in the formula is at least one of Gd, Sm, Eu, Tb, Dy, Y, and Ho, with a content m of 0.06, and the elements shown in the column "m" of Table 3 were used to provide the content for the elements as shown in the columns, specific starting raw materials were weighed, mixed in water in a ball mill, subjected to calcination at 1150° C. in the atmosphere, and ground. In this way, main constituent powders were obtained.

Next, respective powders of $V_2O_3$ and $SiO_2$, as well as respective powders of $Sm_2O_3$, $Eu_2O_3$, $Tb_2O_3$, $DyCO_3$, $Y_2O_3$, $Ho_2O_3$, $Er_2O_3$, $Tm_2O_3$, $Pr_2O_3$, $Nd_2O_3$, and $Sc_2O_3$ as starting raw materials for R each with a purity of 99.8% or more were prepared. The powders were weighed so that the contained parts by mol for each of V and Si were respectively 0.5 parts by mol and 2.5 parts by mol with respect to 100 parts by mol of the main constituent, and so that the contained parts by mol for R had the value of c in Table 3, and mixed with the main constituent powder in water in a ball mill. These mixed materials were subjected to drying to provide ceramic raw material powders.

TABLE 3

| Sample Number | m Content/Element | c Content/Element |
|---|---|---|
| 37 | 0.06/Gd | 0.0 |
| *38 | 0.06/Sm | 0.0 |
| *39 | 0.06/Eu | 0.0 |
| *40 | 0.06/Tb | 0.0 |
| *41 | 0.06/Dy | 0.0 |
| *42 | 0.06/Y | 0.0 |
| *43 | 0.06/Ho | 0.0 |
| *44 | 0.02/Gd 0.04/Dy | 0.0 |
| 45 | 0.042/Gd 0.018/Dy | 0.0 |
| 46 | 0.045/Gd 0.015/Y | 0.0 |
| 47 | 0.045/Gd 0.015/Ho | 0.0 |
| 48 | 0.045/Gd 0.015/Eu | 0.0 |
| 49 | 0.05/Gd 0.01/Er | 0.0 |
| 50 | 0.05/Gd 0.01/Sm | 0.0 |
| 51 | 0.05/Gd 0.01/Nd | 0.0 |
| 52 | 0.055/Gd 0.005/Yb | 0.0 |
| 53 | 0.055/Gd 0.005/Lu | 0.0 |
| 54 | 0.058/Gd 0.002/Dy | 1.0/Dy |
| 55 | 0.058/Gd 0.002/Dy | 2.0/Dy |
| *56 | 0.058/Gd 0.002/Dy | 3.0/Dy |
| 57 | 0.058/Gd 0.002/Dy | 1.0/Er |
| 58 | 0.058/Gd 0.002/Dy | 1.0/Y |
| 59 | 0.058/Gd 0.002/Dy | 1.0/Ho |
| 60 | 0.058/Gd 0.002/Dy | 1.0/Tb |
| 61 | 0.058/Gd 0.002/Dy | 1.0/Eu |
| 62 | 0.058/Gd 0.002/Dy | 1.0/Sm |
| 63 | 0.06/Gd | 0.5/Sc |
| 64 | 0.06/Gd | 0.5/Tm |
| 65 | 0.06/Gd | 0.5/Pr |
| 66 | 0.06/Gd | 0.5/Nd |

Next, these ceramic raw material powders were used to obtain laminated ceramic capacitors according to samples 37 to 66 in accordance with the same method as in Experimental Example 1.

Then, the dielectric constant, the AC rate of change in dielectric constant, and the number of defectives in a high temperature load test were obtained in accordance with the same methods as in the case of Experimental Example 1 for the laminated ceramic capacitors according to for each of samples 37 to 66. The results are shown in Table 4.

TABLE 4

| Sample Number | Dielectric Constant $\epsilon_r$ | AC Rate of Change (%) | The Number of Defectives after 2000 hours in High Temperature Load Test | The Number of Defectives after 1000 hours in High Temperature Load Test |
|---|---|---|---|---|
| 37 | 3400 | −3.4 | 0/100 | 0/100 |
| *38 | 2430 | −1.4 | 100/100 | 97/100 |
| *39 | 2840 | −2.1 | 100/100 | 75/100 |
| *40 | 3990 | −5.1 | 100/100 | 67/100 |
| *41 | 4040 | −10.4 | 100/100 | 73/100 |
| *42 | 4200 | −13.3 | 100/100 | 88/100 |
| *43 | 4610 | −11.9 | 100/100 | 79/100 |
| *44 | 3960 | −10.2 | 100/100 | 63/100 |
| 45 | 3590 | −11.5 | 0/100 | 0/100 |
| 46 | 3240 | −10.4 | 0/100 | 0/100 |
| 47 | 3330 | −10.7 | 0/100 | 0/100 |
| 48 | 2820 | −2.1 | 0/100 | 0/100 |
| 49 | 4180 | −11.2 | 0/100 | 0/100 |
| 50 | 2550 | −1.7 | 0/100 | 0/100 |
| 51 | 2290 | −1.3 | 0/100 | 0/100 |
| 52 | 3870 | −5.9 | 0/100 | 0/100 |
| 53 | 3920 | −12.6 | 0/100 | 0/100 |
| 54 | 3450 | −3.4 | 0/100 | 0/100 |
| 55 | 2970 | −2.9 | 0/100 | 0/100 |
| *56 | 2380 | −2.4 | 100/100 | 10/100 |
| 57 | 3370 | −3.3 | 0/100 | 0/100 |
| 58 | 3400 | −3.4 | 0/100 | 0/100 |
| 59 | 3420 | −3.4 | 0/100 | 0/100 |
| 60 | 2680 | −2.7 | 0/100 | 0/100 |
| 61 | 2570 | −2.5 | 0/100 | 0/100 |
| 62 | 2600 | −2.6 | 0/100 | 0/100 |
| 63 | 3000 | −3.0 | 0/100 | 0/100 |
| 64 | 3280 | −3.2 | 0/100 | 0/100 |
| 65 | 2930 | −2.6 | 0/100 | 0/100 |
| 66 | 2850 | −2.5 | 0/100 | 0/100 |

In Tables 3 and 4, the sample numbers with no symbol * refer to samples within the scope of the present invention and within the preferable range in terms of R content.

As can be seen from Table 4, the samples within the scope of the present invention and within the preferable range can provide great high temperature load resistance characteristics.

In contrast to these samples, when the elements other than Gd were used as the rare earth element contained in the perovskite crystal as in the case of samples 37 to 43, the high temperature load resistance characteristics decreased substantially.

When the content m was less than 0.042 even in the presence of Gd in the crystal as in the case of sample 44, the effect of improvement in high temperature load resistance characteristics was not produced. On the other hand, as long as the content m was 0.042 or more even in the presence of Gd together with the other rare earth elements as in the case of samples 45 to 55 and 57 to 62, the effect of improvement in high temperature load resistance characteristics was produced.

Even when R was added after the synthesis of the perovskite as the main phase as in the case of samples 54, 55, and 57 to 66, great high temperature load resistance characteristics were provided. On the other hand, when the additive amount c of R fell outside the preferable range of 2.0 parts by mol or less as in the case of sample 56, the heterogeneous phase was increased to thereby decrease the high temperature load resistance characteristics.

| | DESCRIPTION OF REFERENCE SYMBOLS |
|---|---|
| 1 | laminated ceramic capacitor |
| 2 | laminate |
| 3 | dielectric ceramic layer |
| 4, 5 | internal electrode |
| 8, 9 | external electrode |

The invention claimed is:

1. A dielectric ceramic containing, as its main constituent, a perovskite compound represented by the compositional formula $(Ba_{1-h-i-m}Ca_hSr_iGd_m)_k(Ti_{1-y-j-n-o-p}Zr_yHf_jMg_nZn_oMn_p)O_3$, in which $0 \leq h \leq 0.03$; $0 \leq i \leq 0.03$; $0.042 \leq m \leq 0.074$; $0.94 \leq k \leq 1.075$; $0 \leq (y+j) \leq 0.05$; $0.015 \leq n \leq 0.07$; $0 \leq o \leq 0.04$; $0 \leq p \leq 0.05$; and $1.0 < m/(n+o) < 4.3$.

2. The dielectric ceramic according to claim 1, further comprising a positive amount which is 3.0 parts by mol or less of M, where M is at least one member selected from the group consisting of V, Cr, Cu, and Ni, and containing 0.2 to 8 parts by mol of Si, both with respect to 100 parts by mol of the main constituent.

3. The dielectric ceramic according to claim 2, further comprising a positive amount which is 2.0 parts by mol or less of R with respect to 100 parts by mol of the main constituent, wherein R is at least one member selected from the group consisting of La, Ce, Pr, Nd, Sm, Eu, Tb, Dy, Ho, Er, Tm, Yb, Lu, Y, and Sc.

4. The dielectric ceramic according to claim 3, wherein $0.05 \leq m \leq 0.072$; and $1.1 < m/(n+o) < 2.3$.

5. The dielectric ceramic according to claim 4, wherein h, i and y are 0.

6. A laminated ceramic capacitor comprising: a laminate comprising a plurality of stacked dielectric ceramic layers and internal electrodes formed along specific interfaces between adjacent dielectric ceramic layers; and external electrodes formed on an outer surface of the laminate electrically connected to specific ones of the internal electrodes, wherein the dielectric ceramic layers comprises the dielectric ceramic according to claim 4.

7. The laminated ceramic capacitor according to claim 6, wherein the internal electrodes contain Ni as their main constituent.

8. A laminated ceramic capacitor comprising: a laminate comprising a plurality of stacked dielectric ceramic layers and internal electrodes formed along specific interfaces between adjacent dielectric ceramic layers; and external electrodes formed on an outer surface of the laminate electrically connected to specific ones of the internal electrodes, wherein the dielectric ceramic layers comprises the dielectric ceramic according to claim 3.

9. The laminated ceramic capacitor according to claim 8, wherein the internal electrodes contain Ni as their main constituent.

10. A laminated ceramic capacitor comprising: a laminate comprising a plurality of stacked dielectric ceramic layers and internal electrodes formed along specific interfaces between adjacent dielectric ceramic layers; and external electrodes formed on an outer surface of the laminate electrically connected to specific ones of the internal electrodes, wherein the dielectric ceramic layers comprises the dielectric ceramic according to claim 2.

11. The laminated ceramic capacitor according to claim 10, wherein the internal electrodes contain Ni as their main constituent.

12. The dielectric ceramic according to claim 1, further comprising a positive amount which is 2.0 parts by mol or less of R with respect to 100 parts by mol of the main constituent, wherein R is at least one member selected from the group consisting of La, Ce, Pr, Nd, Sm, Eu, Tb, Dy, Ho, Er, Tm, Yb, Lu, Y, and Sc.

13. The dielectric ceramic according to claim 12, wherein $0.05 \leq m \leq 0.072$; and $1.1 < m/(n+o) < 2.3$.

14. The dielectric ceramic according to claim 13, wherein h, i and y are 0.

15. A laminated ceramic capacitor comprising: a laminate comprising a plurality of stacked dielectric ceramic layers and internal electrodes formed along specific interfaces between adjacent dielectric ceramic layers; and external electrodes formed on an outer surface of the laminate electrically connected to specific ones of the internal electrodes, wherein the dielectric ceramic layers comprises the dielectric ceramic according to claim 12.

16. The laminated ceramic capacitor according to claim 15, wherein the internal electrodes contain Ni as their main constituent.

17. The dielectric ceramic according to claim 1, wherein h, i and y are 0.

18. A laminated ceramic capacitor comprising: a laminate comprising a plurality of stacked dielectric ceramic layers and internal electrodes formed along specific interfaces between adjacent dielectric ceramic layers; and external electrodes formed on an outer surface of the laminate electrically connected to specific ones of the internal electrodes, wherein the dielectric ceramic layers comprises the dielectric ceramic according to claim 1.

19. The laminated ceramic capacitor according to claim 18, wherein the internal electrodes contain Ni as their main constituent.

* * * * *